(12) United States Patent
Cartwright

(10) Patent No.: US 7,604,255 B2
(45) Date of Patent: Oct. 20, 2009

(54) STEERING COLUMN RELEASE MECHANISM

(75) Inventor: Mark A. Cartwright, West Lafayette, IN (US)

(73) Assignee: TRW Automotive U.S. LLC, Livonia, MI (US)

( * ) Notice: Subject to any disclaimer, the term of this patent is extended or adjusted under 35 U.S.C. 154(b) by 295 days.

(21) Appl. No.: 11/440,638

(22) Filed: May 25, 2006

(65) Prior Publication Data

US 2007/0273130 A1 Nov. 29, 2007

(51) Int. Cl.
*B62D 1/00* (2006.01)
(52) U.S. Cl. ..................................... 280/777
(58) Field of Classification Search ................. 280/777
See application file for complete search history.

(56) References Cited

U.S. PATENT DOCUMENTS

| | | | |
|---|---|---|---|
| 6,116,648 A * | 9/2000 | Holly et al. | 280/777 |
| 6,290,258 B1 * | 9/2001 | Parkinson et al. | 280/775 |
| 6,908,110 B2 * | 6/2005 | Ross et al. | 280/777 |
| 6,952,979 B2 | 10/2005 | Cartwright et al. | |
| 7,080,855 B2 * | 7/2006 | Muller | 280/777 |
| 7,198,297 B2 * | 4/2007 | Satou et al. | 280/777 |
| 2004/0211612 A1 * | 10/2004 | Muller | 180/271 |
| 2005/0194777 A1 * | 9/2005 | Manwaring et al. | 280/777 |
| 2005/0248142 A1 * | 11/2005 | Li et al. | 280/777 |

* cited by examiner

*Primary Examiner*—Paul N Dickson
*Assistant Examiner*—Nicole Verley
(74) *Attorney, Agent, or Firm*—Tarolli, Sundheim, Covell & Tummino LLP

(57) ABSTRACT

A steering column (10) includes a steering column member (12) connectable with a steering wheel (16) and rotatable to turn steerable vehicle wheels. A mounting bracket (40) connects the steering column (10) to a vehicle frame. A support (30), through which the steering column member (12) extends, is connected with the mounting bracket (40). The support (30) supports the steering column member (12) for rotation about a longitudinal axis (32) of the steering column member and is movable relative to the mounting bracket (40). A locking mechanism (60) applies a force to lock the support (30) in any one of the plurality of positions relative to the mounting bracket (40). A release mechanism (70) reduces the force applied by the locking mechanism (60) in response to a sensed vehicle condition.

23 Claims, 2 Drawing Sheets

STEERING COLUMN RELEASE MECHANISM

FIELD OF THE INVENTION

The present invention relates to an adjustable steering column, and more specifically, to a release mechanism for releasing a locking mechanism of an adjustable steering column in response to a sensed vehicle condition.

BACKGROUND OF THE INVENTION

An adjustable steering column for a vehicle generally includes a steering column member connectable with a steering wheel. The steering wheel includes an inflatable occupant protection device for helping protect an occupant of the vehicle during a crash situation. The steering column member extends through a support. A locking mechanism locks the support in any one of a plurality of positions relative to a mounting bracket. Accordingly, an inflatable occupant protection device connected with the steering wheel may be in any one of a plurality of positions relative to an occupant of the vehicle.

SUMMARY OF THE INVENTION

A steering column of the present invention includes a steering column member connectable with a steering wheel and rotatable to turn steerable vehicle wheels. A mounting bracket connects the steering column to a vehicle frame. A support, through which the steering column member extends, is connected with the mounting bracket. The support supports the steering column member for rotation about a longitudinal axis of the steering column member and is movable relative to the mounting bracket. A locking mechanism applies a force to lock the support in any one of a plurality of positions relative to the mounting bracket. A release mechanism reduces the force applied by the locking mechanism in response to a sensed vehicle condition.

In another aspect of the present invention, a locking mechanism has a first position in which a support is prevented from moving relative to a mounting bracket. The locking mechanism has a second position in which the support is movable relative to the mounting bracket. A release mechanism moves the locking mechanism from the first position toward the second position in response to a sensed vehicle condition.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF THE INVENTION

Figure 1:
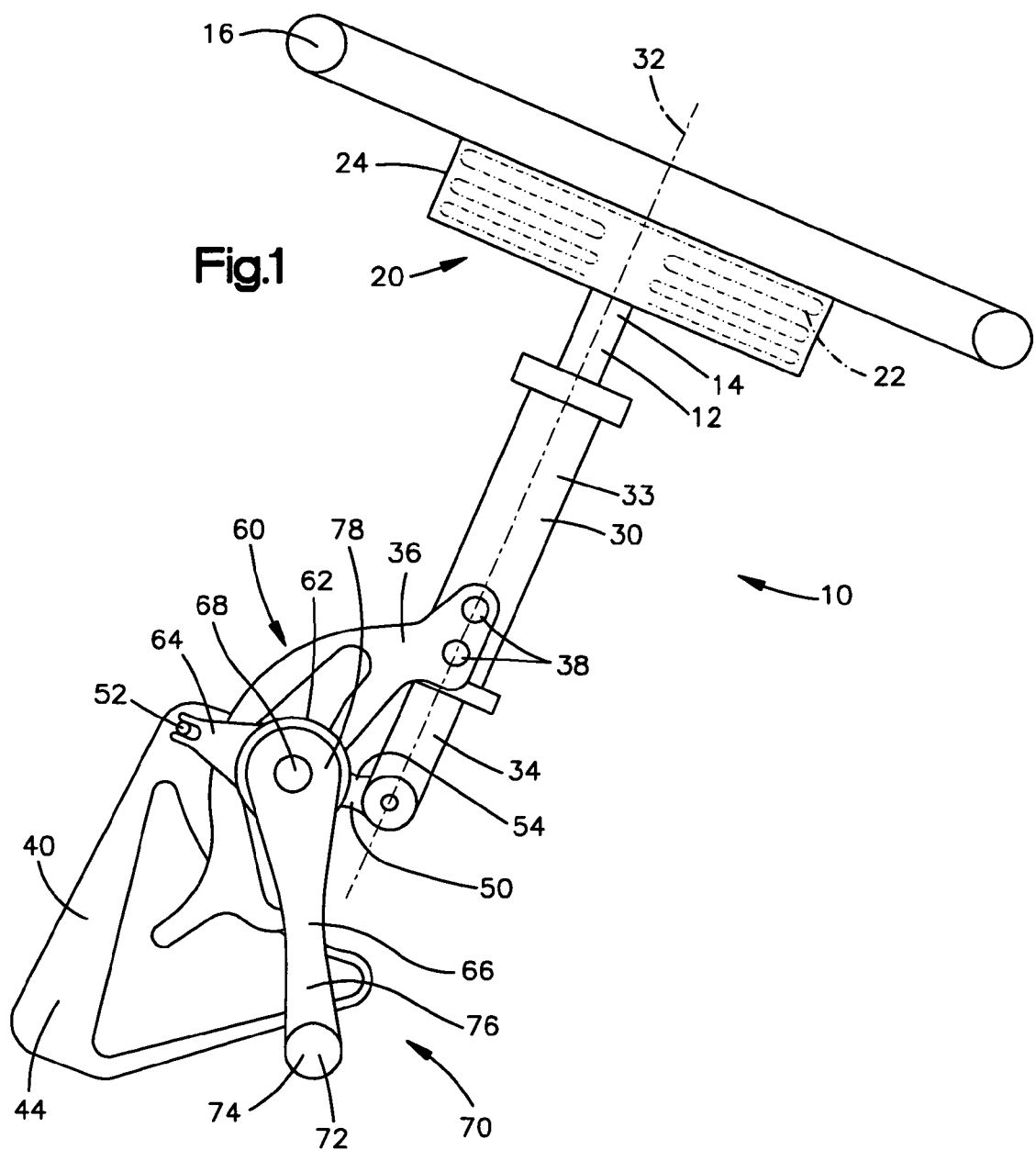
FIG. 1 is a schematic side view of a steering column constructed in accordance with the present invention showing a locking mechanism in a first position.
Figure 2:
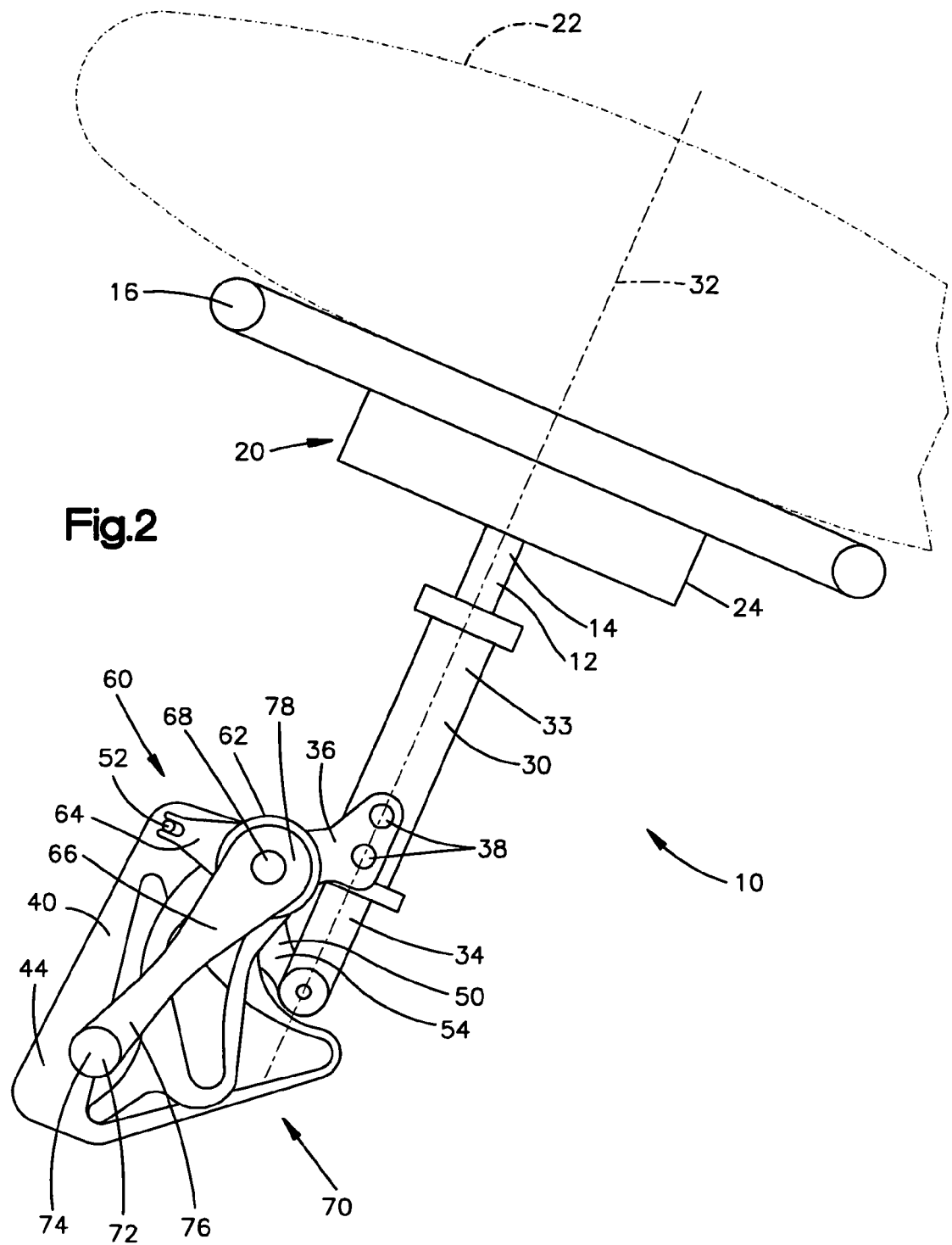
FIG. 2 is a schematic side view of the steering column of FIG. 1 showing the locking mechanism in a second position.

An exemplary vehicle steering column 10 is schematically illustrated in FIGS. 1 and 2. The steering column 10 may be generally similar to the steering column described in U.S. Pat. No. 6,952,979, which is incorporated herein by reference in its entirety. The steering column 10 may include a rotatable steering column member 12 to turn steerable vehicle wheels (not shown). The steering column member 12 may have a first end 14 connectable with a steering wheel 16 in any suitable manner. A second end of the steering column member 12 opposite from the end 14 may be connectable with a universal joint (not shown). The universal joint connected with the second end of the steering column member 12 may be connectable with a mechanism designed to transmit movement of the steering column member to a steering gear and permit movement of the steering column member relative to the mechanism, in any suitable manner.

The steering wheel 16 may include an inflatable vehicle occupant protection device 20 in the form of an air bag 22. An inflation fluid source, such as an inflator (not shown), may provide inflation fluid for inflating the air bag 22. The inflator may be connected in fluid communication with the air bag 22. The air bag 22 and inflator may be a part of a module 24. The module 24 can be mounted in the steering wheel 16 as a unit in any suitable manner.

The inflator may be a pyrotechnic inflator that uses the combustion of gas-generating material to generate inflation fluid. The inflator alternatively could contain a stored quantity of pressurized inflation fluid in the form of a gas or could contain a combination of pressurized inflation fluid and ignitable material for inflating the air bag 22. As a further alternative, the inflator could be of any suitable type or construction for supplying a medium for inflating the air bag 22.

A sensor mechanism (not shown) for sensing the occurrence of an event for which inflation of the air bag 22 is desired, such as a vehicle deceleration may be included in the vehicle. Upon sensing the occurrence of such an event, the sensor mechanism may provide an electrical signal to the inflator. The electrical signal may cause the inflator to be actuated in a known manner. The inflator, when actuated, may discharge fluid under pressure into the air bag 22.

The air bag 22 may inflate under the pressure of the inflation fluid from the inflator in any desired manner. This may cause the air bag 22 to inflate from a stored position, shown in FIG. 1, to the position illustrated in FIG. 2. The air bag 22, when inflated, may be positioned between the steering wheel 16 and an occupant of the vehicle. The air bag 22, when inflated, may help to protect a vehicle occupant upon the occurrence of an event for which occupant protection is desired, such as a vehicle deceleration. The air bag 22, when inflated, may help to absorb the energy of impacts with the air bag.

A support 30 (FIGS. 1 and 2) may support the steering column member 12 for rotation about a longitudinal axis 32 of the steering column member. Upon rotation of the steering wheel 16, the steering column member 12 may rotate about the longitudinal axis 32. Upon rotation of the steering column member 12 about the longitudinal axis 32, steerable vehicle wheels (not shown) may be turned in any suitable manner.

The support 30 may have a tubular portion 33 with a passage through which the steering column member 12 extends. Arm portions 34, one of which is shown in FIGS. 1 and 2, may extend from the tubular portion 33. The support 30 may include locking portions 36, one of which is shown in FIGS. 1 and 2, extending axially from opposite sides of the tubular portion 33. The locking portions 36 may include a plurality of plates fixedly connected to each other with spacers between them. It is contemplated that the locking portions 36 may include any desired number of plates. The locking portions 36 may be fixedly connected to the tubular portion 33 by fasteners 38, such as screws.

A mounting bracket 40 (FIGS. 1 and 2) may connect the steering column 10 with a vehicle frame. The mounting bracket 40 may include side walls 44, one of which is shown in FIGS. 1 and 2, extending generally perpendicular to a rear wall and parallel to each other. The mounting bracket 40 may be connected to the vehicle frame by fasteners (not shown), such as bolts.

A pivot member 50 may interconnect the support 30 and the mounting bracket 40. The pivot member 50 may have a first end (not shown) pivotally connected to the side walls 44 by a pivot shaft 52. A second end 54 of the pivot member 50 may pivotally connected with the arm portions 34 of the support 30.

A locking mechanism 60 (FIGS. 1 and 2) may lock the pivot member 50 in any one of a plurality of pivot positions relative to the mounting bracket 40. The locking mechanism 60 may also lock the support 30 in any one of a plurality of pivot positions relative to the pivot member 50. The locking mechanism 60 may apply a force to clamp the side walls 44 between the pivot member 50 and the locking portions 36 of the support 30. It is contemplated that the locking mechanism 60 may be any suitable locking mechanism for preventing movement of the support 30 relative to the mounting bracket 40.

The locking mechanism 60 may include a pair of cam members 62 and 64 rotatable relative to each other. An actuator 66 connected with the cam member 62 may rotate the cam members 62 and 64 relative to each other. The actuator 66 may be a manually engageable handle. It is contemplated that an air cylinder assembly may be used for rotating the actuator 66. It is contemplated that any suitable mechanism may be used to rotate the cam members 62 and 64 relative to each other. The locking mechanism 60 may include a locking shaft 68 extending through the locking portions 36 of the support 30, the side walls 44 of the mounting bracket 40, the pivot member 50, and the cam members 62 and 64.

The cam member 62 may be rotated about the locking shaft 68 relative to the cam 64 and the mounting bracket 40. When the cam members 62 and 64 are in a first position relative to each other, shown in FIG. 1, the locking mechanism 60 may clamp the support 30 to the mounting bracket 40. When the cam members 62 and 64 are in a second position relative to each other, shown in FIG. 2, the support 30 may be movable relative to the mounting bracket 40. Accordingly, the locking mechanism 60 may have a first position, shown in FIG. 1, in which the support 30 is prevented from moving relative to the mounting bracket 40 and a second position, shown in FIG. 2, in which the support is movable relative to the mounting bracket.

A release mechanism 70 may include a vehicle sensitive sensor 72 for sensing vehicle conditions that may be indicative of a vehicle crash event, such as vehicle deceleration at a rate above a predetermined rate. The release mechanism 70 may reduce the force applied by the locking mechanism 60 clamping the support 30, the pivot member 50, and the mounting bracket 40 to each other in response to a vehicle condition. The release mechanism 70 may reduce the force applied by the locking mechanism by moving the locking mechanism from the first position toward the second position.

The release mechanism 70 may move the locking mechanism 60 from the first position toward the second position to reduce the force applied by the locking mechanism by a first amount in response to a first sensed vehicle condition, such as vehicle deceleration at a rate above a first predetermined rate. The release mechanism 70 may move the locking mechanism 60 from the first position to a position between the first and second positions to reduce the force applied by the locking mechanism. The release mechanism 70 may move the locking mechanism 60 from the first position toward the second position to release the force applied by the locking mechanism by a second amount larger than the first amount in response to a second sensed vehicle condition, such as vehicle deceleration at a rate above a second predetermined rate larger than the first predetermined rate. It is contemplated that the release mechanism 70 may move the locking mechanism 60 from the first position to the second position to release the force applied by the locking mechanism in response to the second sensed vehicle condition.

If the release mechanism 70 reduces the force applied by the locking mechanism 60 by the first amount, the support 30 may be prevented from moving relative to the mounting bracket 40. The support 30 may be movable relative to the mounting bracket 40 upon application of a first predetermined force to the support. The force may be applied to the support 30 by an impact with the steering wheel 16 or the inflated air bag 22. Accordingly, the steering column 10 may collapse from the position shown in FIG. 1 to the position shown in FIG. 2 to absorb energy of an impact with the steering wheel 16 or the air bag 22. The force may be applied to the support 30 in response to activation of the occupant protection device 20. Activation of the air bag 22 may move the support 30 into a desired position, such as the position shown in FIG. 2, relative to an occupant of the vehicle. Accordingly, the support 30 remains in an adjusted position relative to the mounting bracket 40 until the first predetermined force is applied to the support.

If the release mechanism 70 reduces the force applied by the locking mechanism 60 by the second amount, the support 30 may move relative to the mounting bracket 40 from the position shown in FIG. 1 to the position shown in FIG. 2 in response to gravitational forces and/or forces due to deceleration of the vehicle acting on the support. The support 30 may move into a desired position, such as the position shown in FIG. 2, relative to an occupant prior to activation of the occupant protection device 20. The air bag 22 may be in a desired location relative to the occupant upon activation. It is also contemplated that the support 30 may be prevented from moving relative to the mounting bracket 40 and may be movable relative to the mounting bracket upon application of a second predetermined force to the support smaller than the first predetermined force.

The sensor 72 may include an inertia member 74 movable in response to vehicle deceleration at a rate above the first and second predetermined rates to actuate the release mechanism 70. The inertia member 74 may move a first distance in response to vehicle deceleration at a rate above the first predetermined rate to reduce the force applied by the locking mechanism 60 by the first amount. The inertia member 74 may move a second distance in response to vehicle deceleration at a rate above the second predetermined rate to reduce the force applied by the locking mechanism 60 by the second amount.

The inertia member 74 may be radially spaced from the cam member 62 and connected to a first end 76 of the actuator 66. The first end 76 may be opposite a second end 78 of the actuator that is connected to the rotatable cam member 62. It is contemplated that the inertia member 74 may be formed as one piece with the actuator 66. The cam member 62 may rotate relative to the mounting bracket 40 upon movement of the inertia member 74.

The actuator 66 may extend radially from the locking shaft 68. The actuator 66 may extend downward, as viewed in FIG. 1, when the locking mechanism 60 prevents movement of the support 30 relative to the mounting bracket 40. The actuator 66 may be rotated clockwise, as viewed in FIG. 1, to the position shown in FIG. 2 to permit movement of the support 30 relative to the mounting bracket 40 by an occupant of the vehicle.

The inertia member 74 may move relative to the mounting bracket 40 in response to the first and second sensed vehicle conditions. For example, when the vehicle experiences a sudden deceleration, the mounting bracket 40, which is fixed relative to the vehicle, may also experience the deceleration. The inertia member 74, however, is not fixed relative to the vehicle and may continue in motion as the deceleration occurs. As a result, the inertia member 74 may move relative to the mounting bracket 40. Movement of the inertia member 74 relative to the mounting bracket 40 may result in pivotal movement of the actuator 66 and the cam member 62 relative to the mounting bracket 40. The actuator 66 may pivot in the clockwise direction to reduce the force applied by the locking mechanism 60.

When the vehicle sensitive sensor 72 senses the first sensed vehicle condition, such as vehicle deceleration above the first predetermined rate, the release mechanism 70 may move the locking mechanism 60 from the first position, shown in FIG. 1, toward the second position, shown in FIG. 2, to reduce the force applied by the locking mechanism by a first amount. The support 30 may be prevented from moving relative to the mounting bracket 40. The first predetermined force may be applied to the support 30 by an impact with the steering wheel 16 or an impact with the air bag 22. The steering column 10 may collapse from the position shown in FIG. 1 to the position shown in FIG. 2 to absorb energy of the impact with the steering wheel 16 or the air bag 22. The first predetermined force may be applied to the support 30 in response to activation of the occupant protection device 20. Activation of the air bag 22 may move the support 30 from the position shown in FIG. 1 into a desired position, such as the position shown in FIG. 2.

When the vehicle sensitive sensor 72 senses the second sensed vehicle condition, such as vehicle deceleration above the second predetermined rate, the release mechanism 70 may move the locking mechanism 60 from the first position, shown in FIG. 1, to the second position, shown in FIG. 2, to reduce the force applied by the locking mechanism by the second amount. The support 30 may move relative to the mounting bracket 40 in response to gravitational forces and/or forces due to deceleration of the vehicle acting on the support. The support 30 may move into a desired position, such as the position shown in FIG. 2, relative to an occupant prior to activation of the occupant protection device 20. The air bag 22 may be in a desired position relative to the occupant upon activation.

From the above description of the invention, those skilled in the art will perceive improvements, changes and modifications. Such improvements, changes and modifications within the skill of the art are intended to be covered by the appended claims.

Having described the invention, the following is claimed:

1. A steering column for a vehicle comprising:
   a steering column member connectable with a steering wheel and rotatable to turn steerable vehicle wheels;
   a mounting bracket which connects said steering column to a vehicle frame;
   a support connected with said mounting bracket and through which said steering column member extends, said support supporting said steering column member for rotation about a longitudinal axis of said steering column member and being movable relative to said mounting bracket;
   a locking mechanism which applies a force to lock said support in any one of a plurality of positions relative to said mounting bracket; and
   a release mechanism that reduces the force applied by said locking mechanism by a first amount in response to a first sensed vehicle condition, said locking mechanism including an actuator rotatable relative to said mounting bracket by manual actuation to selectively lock said support in any one of said plurality of positions relative to said mounting bracket, said release mechanism being connected with said actuator and rotating said actuator in response to said first sensed vehicle condition.

2. A steering column as set forth in claim 1 wherein said release mechanism includes a vehicle sensitive sensor that is responsive to said first sensed vehicle condition.

3. A steering column as set forth in claim 1 wherein an inflatable occupant protection device is connected with said steering wheel.

4. A steering column as set forth in claim 3 wherein said support moves relative to said mounting bracket in response to activation of said occupant protection device after said release mechanism reduces the force applied by said locking mechanism by said first amount.

5. A steering column as set forth in claim 1 wherein said release mechanism releases the force applied by said locking mechanism in response to a second sensed vehicle condition.

6. A steering column as set forth in claim 1 wherein said release mechanism is mechanically actuated.

7. A steering column for a vehicle comprising:
   a steering column member connectable with a steering wheel and rotatable to turn steerable vehicle wheels;
   a mounting bracket which connects said steering column to a vehicle frame;
   a support connected with said mounting bracket and through which said steering column member extends, said support supporting said steering column member for rotation about a longitudinal axis of said steering column member and being movable relative to said mounting bracket;
   a locking mechanism which applies a force to lock said support in any one of a plurality of positions relative to said mounting bracket; and
   a release mechanism that reduces the force applied by said locking mechanism by a first amount in response to a first sensed vehicle condition, said release mechanism including a vehicle sensitive sensor that is responsive to said first sensed vehicle condition, release mechanism including an inertia member.

8. A steering column as set forth in claim 7 wherein said inertia member is connected with said locking mechanism, said inertia member moving in response to said first sensed vehicle condition to reduce the force applied by said locking mechanism.

9. A steering column as set forth in claim 8 wherein said locking mechanism includes a member rotatable relative to said mounting bracket, said inertia member being connected with said member and rotating said member in response to said first sensed vehicle condition.

10. A steering column for a vehicle comprising:
   a steering column member connectable with a steering wheel and rotatable to turn steerable vehicle wheels;
   a mounting bracket which connects said steering column to a vehicle frame;
   a support connected with said mounting bracket and through which said steering column member extends, said support supporting said steering column member for rotation about a longitudinal axis of said steering column member and being movable relative to said mounting bracket;

a locking mechanism which applies a force to lock said support in any one of a plurality of positions relative to said mounting bracket; and a release mechanism that reduces the force applied by said locking mechanism by a first amount in response to a first sensed vehicle condition;

said release mechanism including a vehicle sensitive sensor that is responsive to said first sensed vehicle condition;

said release mechanism including an inertia member, said inertia member being connected with said locking mechanism, said inertia member moving in response to said first sensed vehicle condition to reduce the force applied by said locking mechanism;

said locking mechanism including a member rotatable relative to said mounting bracket, said inertia member being connected with said member and rotating said member in response to said first sensed vehicle condition, said inertia member including a mass spaced radially from said rotatable member.

11. A steering column for a vehicle comprising:

a steering column member connectable with a steering wheel and rotatable to turn steerable vehicle wheels;

a mounting bracket which connects said steering column to a vehicle frame;

a support connected with said mounting bracket and through which said steering column member extends, said support supporting said steering column member for rotation about a longitudinal axis of said steering column member and being movable relative to said mounting bracket;

a locking mechanism which applies a force to lock said support in any one of a plurality of positions relative to said mounting bracket; and a release mechanism that reduces the force applied by said locking mechanism by a first amount in response to a first sensed vehicle condition, said release mechanism reducing the force applied by said locking mechanism by a second amount larger than said first amount in response to a second sensed vehicle condition.

12. A steering column for a vehicle comprising:

a steering column member connectable with a steering wheel and rotatable to turn steerable vehicle wheels;

a mounting bracket which connects said steering column to a vehicle frame;

a support connected with said mounting bracket and through which said steering column member extends, said support supporting said steering column member for rotation about a longitudinal axis of said steering column member and being movable relative to said mounting bracket;

a locking mechanism which applies a force to lock said support in any one of a plurality of positions relative to said mounting bracket; and a release mechanism that reduces the force applied by said locking mechanism by a first amount in response to a first sensed vehicle condition;

said locking mechanism preventing movement of said support relative to said mounting bracket after said release mechanism reduces the force applied by said locking mechanism by said first amount, said support being movable relative to said mounting bracket upon application of a predetermined force to said support.

13. A steering column for a vehicle comprising:

a steering column member connectable with a steering wheel and rotatable to turn steerable vehicle wheels;

a mounting bracket which connects said steering column to a vehicle frame;

a support connected with said mounting bracket and through which said steering column member extends, said support supporting said steering column member for rotation about a longitudinal axis of said steering column member and being movable relative to said mounting bracket;

a locking mechanism which applies a force to lock said support in any one of a plurality of positions relative to said mounting bracket; and a release mechanism that reduces the force applied by said locking mechanism by a first amount in response to a first sensed vehicle condition;

said support being pivotally connected with a member, said member being pivotally connected with said mounting bracket, said locking mechanism preventing pivotal movement of said support relative to said member and pivotal movement of said member relative to said mounting bracket.

14. A steering column for a vehicle comprising:

a steering column member connectable with a steering wheel and rotatable to turn steerable vehicle wheels;

a mounting bracket which connects said steering column to a vehicle frame;

a support connected with said mounting bracket and through which said steering column member extends, said support supporting said steering column member for rotation about a longitudinal axis of said steering column member and being movable relative to said mounting bracket;

a locking mechanism having a first position in which said support is prevented from moving relative to said mounting bracket and a second position in which said support is movable relative to said mounting bracket; and a release mechanism that moves said locking mechanism from said first position toward said second position in response to a first sensed vehicle condition, said locking mechanism including an actuator rotatable relative to said mounting bracket by manual actuation to selectively lock said support in any one of said plurality of positions relative to said mounting bracket, said release mechanism being connected with said actuator and rotating said actuator in response to said first sensed vehicle condition.

15. A steering column as set forth in claim 14 wherein said steering wheel includes an inflatable occupant protection device.

16. A steering column as set forth in claim 15 wherein said support moves relative to said mounting bracket in response to activation of said occupant protection device after said release mechanism moves said locking mechanism from said first position toward said second position.

17. A steering column as set forth in claim 14 wherein said release mechanism moves said locking mechanism from said first position to said second position in response to a second sensed vehicle condition.

18. A steering column as set forth in claim 14 wherein said locking mechanism applies a force to lock said support in any one of a plurality of positions relative to said mounting bracket.

19. A steering column as set forth in claim 14 wherein said release mechanism is mechanically actuated.

20. A steering column for a vehicle comprising:
a steering column member connectable with a steering wheel and rotatable to turn steerable vehicle wheels;
a mounting bracket which connects said steering column to a vehicle frame;
a support connected with said mounting bracket and through which said steering column member extends, said support supporting said steering column member for rotation about a longitudinal axis of said steering column member and being movable relative to said mounting bracket;
a locking mechanism having a first position in which said support is prevented from moving relative to said mounting bracket and a second position in which said support is movable relative to said mounting bracket; and
a release mechanism that moves said locking mechanism from said first position toward said second position in response to a first sensed vehicle condition, said release mechanism including an inertia member connected with said locking mechanism, said inertia member moving in response to said first sensed vehicle condition to move said locking mechanism from said first position toward said second position.

21. A steering column as set forth in claim 20 wherein said locking mechanism includes a member rotatable relative to said mounting bracket, said inertia member being connected with said member and rotating said member relative to said mounting bracket in response to said first sensed vehicle condition.

22. A steering column for a vehicle comprising:
a steering column member connectable with a steering wheel and rotatable to turn steerable vehicle wheels;
a mounting bracket which connects said steering column to a vehicle frame;
a support connected with said mounting bracket and through which said steering column member extends, said support supporting said steering column member for rotation about a longitudinal axis of said steering column member and being movable relative to said mounting bracket;
a locking mechanism having a first position in which said support is prevented from moving relative to said mounting bracket and a second position in which said support is movable relative to said mounting bracket; and
a release mechanism that moves said locking mechanism from said first position toward said second position in response to a first sensed vehicle condition;
said locking mechanism preventing movement of said support relative to said mounting bracket after said release mechanism moves said locking mechanism from said first position toward said second position, said support being movable relative to said mounting bracket upon application of a predetermined force to said support.

23. A steering column for a vehicle comprising:
a steering column member connectable with a steering wheel and rotatable to turn steerable vehicle wheels;
a mounting bracket which connects said steering column to a vehicle frame;
a support connected with said mounting bracket and through which said steering column member extends, said support supporting said steering column member for rotation about a longitudinal axis of said steering column member and being movable relative to said mounting bracket;
a locking mechanism having a first position in which said support is prevented from moving relative to said mounting bracket and a second position in which said support is movable relative to said mounting bracket; and
a release mechanism that moves said locking mechanism from said first position toward said second position in response to a first sensed vehicle condition;
said support being pivotally connected with a member, said member being pivotally connected with said mounting bracket, said locking mechanism preventing pivotal movement of said support relative to said member and pivotal movement of said member relative to said mounting bracket.

* * * * *

UNITED STATES PATENT AND TRADEMARK OFFICE
CERTIFICATE OF CORRECTION

PATENT NO.      : 7,604,255 B2
APPLICATION NO. : 11/440638
DATED           : October 20, 2009
INVENTOR(S)     : Mark A. Cartwright It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 443 days.

Signed and Sealed this

Fifth Day of October, 2010

David J. Kappos
*Director of the United States Patent and Trademark Office*